United States Patent [19]
Gelbwachs

[11] Patent Number: 5,060,085
[45] Date of Patent: Oct. 22, 1991

[54] DEEP BLUE ATOMIC FILTER WITH INTRINSIC SOLAR BACKGROUND REDUCTION

[75] Inventor: Jerry A. Gelbwachs, Hermosa Beach, Calif.

[73] Assignee: The Aerospace Corporation, El Segundo

[21] Appl. No.: 493,586

[22] Filed: Mar. 14, 1990

[51] Int. Cl.$^5$ .................................. H04B 10/10
[52] U.S. Cl. ........................ 359/160; 250/361 C; 250/458.1; 359/326
[58] Field of Search .............. 250/361 R, 361 C, 362, 250/363.01, 367, 365, 393, 458.1, 461.1, 484.1; 307/425; 367/131, 132; 455/40, 609, 610, 617, 619

[56] References Cited
U.S. PATENT DOCUMENTS
4,829,597 5/1989 Gelbwachs ..................... 455/609

Primary Examiner—Reinhard J. Eisenzopf
Assistant Examiner—L. Pascal
Attorney, Agent, or Firm—William J. Burke

[57] ABSTRACT

An optical atomic resonance filter using a pump laser, a buffer gas and calcium as an atomic vapor converts signals at the g Fraunhofer wavelength (422.674 nm) to UV light which is readily detectable by high sensitivity, large area, low noise, conventional photomultiplier tubes.

3 Claims, 2 Drawing Sheets

DEEP BLUE ATOMIC FILTER WITH INTRINSIC SOLAR BACKGROUND REDUCTION

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

The invention relates to supression of solar background in laser receivers that utilize atomic resonance transitions as an ultranarrowband optical filter and more particularly to a filter which is based on transitions in calcium and overlaps the g Fraunhofer line at 422.674 nm in the deep blue spectral region.

2. Description of the Prior Art

There is a strong need to develop communication systems to submarines from satellites and aircraft. One such technique is illustrated in FIG. 1. On the signal from a ground station 6, laser transmitter 2 transmits a signal at wavelength $\lambda_s$. After passing through the atmosphere 8 and seawater 10, signals at wavelength $\lambda_s$ are filtered by atomic resonance filter 12 which blocks out background sunlight $\lambda$. Filter 12 converts signals at wavelength $\lambda_s$ to output emission at wavelength $\lambda_o$. That output is detected by detectors 14 like photomultiplier tubes which are mounted on submarine 16.

The blue-green spectral region is considered the best wavelength region for underwater communication because the maximum penetration of ocean water by electromagnetic radiation occurs here. Therefore, techniques based upon blue-green laser transmitters are being pursued for this application. The feasibility of underwater laser communication hinges upon the development of an ultranarrowband, wide-angle optical filter that can adequately reject solar background. Other important applications include antisubmarine warfare, interplanetary laser communications, laser radar, sea floor mapping, atmospheric radar, plasma diagnostics, and combustion research.

In the past, multi-layer dielectric filters and birefringent filters were developed for this application. In recent years emphasis has shifter to atomic filters. These devices are ultranarrowband (0.01 Å), isotropic, wide field of view filters. They derive their ultranarrowband properties from transitions between discrete atomic levels. Atomic filters operate at numerous discrete wavelengths throughout the near UV, visible and near IR spectral regions. Laboratory exploration of atomic filtering action has been conducted on cesium and rubidium ground state species and optically-pumped transitions in rubidium, thallium-cesium, potassium, and magnesium. A recent report from the Naval Ocean Systems Command (NOSC) provides an assessment of ultranarrowband optical filter performance and developmental status for submarine communications. R. D. Anderson, R. R. James, and J. W. Rockway, NOSC Tech. Rep. 1291 (1989).

U.S. Pat. No. 4,829,597 teaches that the Fraunhofer lines can be exploited to significantly reduce solar background. Fraunhofer lines are intense dips (minima) in the solar spectrum. They arise from absorption in the outer layer of the sun by heavy elements. These lines have been well studied by solar astronomers. At the most intense lines, the solar background falls below 10% of its continuum value. These dips are natural low background channels for narrowband atmospheric optical transmission. A laser communications system operating in a Fraunhofer dip with a suitable ultranarrowband filter would experience significantly reduced background compared to operation against the full solar background.

However, there are fewer than ten intense Fraunhofer lines in the blue-green spectral region. Owing to their narrow spectral width and the extremely sharp widths of atomic transitions (0.01 Å), it is highly improbable that an exact overlap between a Fraunhofer line and a random atomic filter can be found.

U.S. Pat. No. 4,829,597 discloses an atomic filter that overlaps an intense Fraunhofer line at 518 nm. It is based upon transitions in the triplet manifold of magnesium. This filter possesses highly desirable filter properties as well as strong solar background rejection. The details of the Mg filter operation can be found elsewhere. See J. A. Gelbwachs, *Laser Spectoscopy VIII*, W. Persson and S. Svanberg, eds. (Spring-Verlag 1987) p. 409. It is the first atomic filter that matches an intense Fraunhofer line.

However, the deep blue spectral region (420–450 nm) has been shown to be a preferred band for transmission through seawater. If a good atomic filter could be found in this region it would afford an additional wavelength option for submarine communications, antisubmarine warfare, and seafloor mapping.

Therefore, the principal object of the present invention is to provide a filter which maximize solar background rejection.

It is another object to provide a filter which operates in the deep blue spectral region (420–450 nm), thus providing good penetration through deep seawater.

SUMMARY OF THE INVENTION

The invention is an optical atomic resonance filter which is based upon the spectroscpy of atomic calcium. The filter operates at 422.674 nm, thereby matching the g Fraunhofer line. This Fraunhofer line is the most intense in the visible spectrum and, hence, provides maximum sunlight suppression. At this line, the solar transmission is only 2.4 percent of the continuum value, thus achieving a forty-fold reduction in solar background.

DETAILED DESCRIPTION OF THE PREFERRED EMBODIMENT

Figure 1:
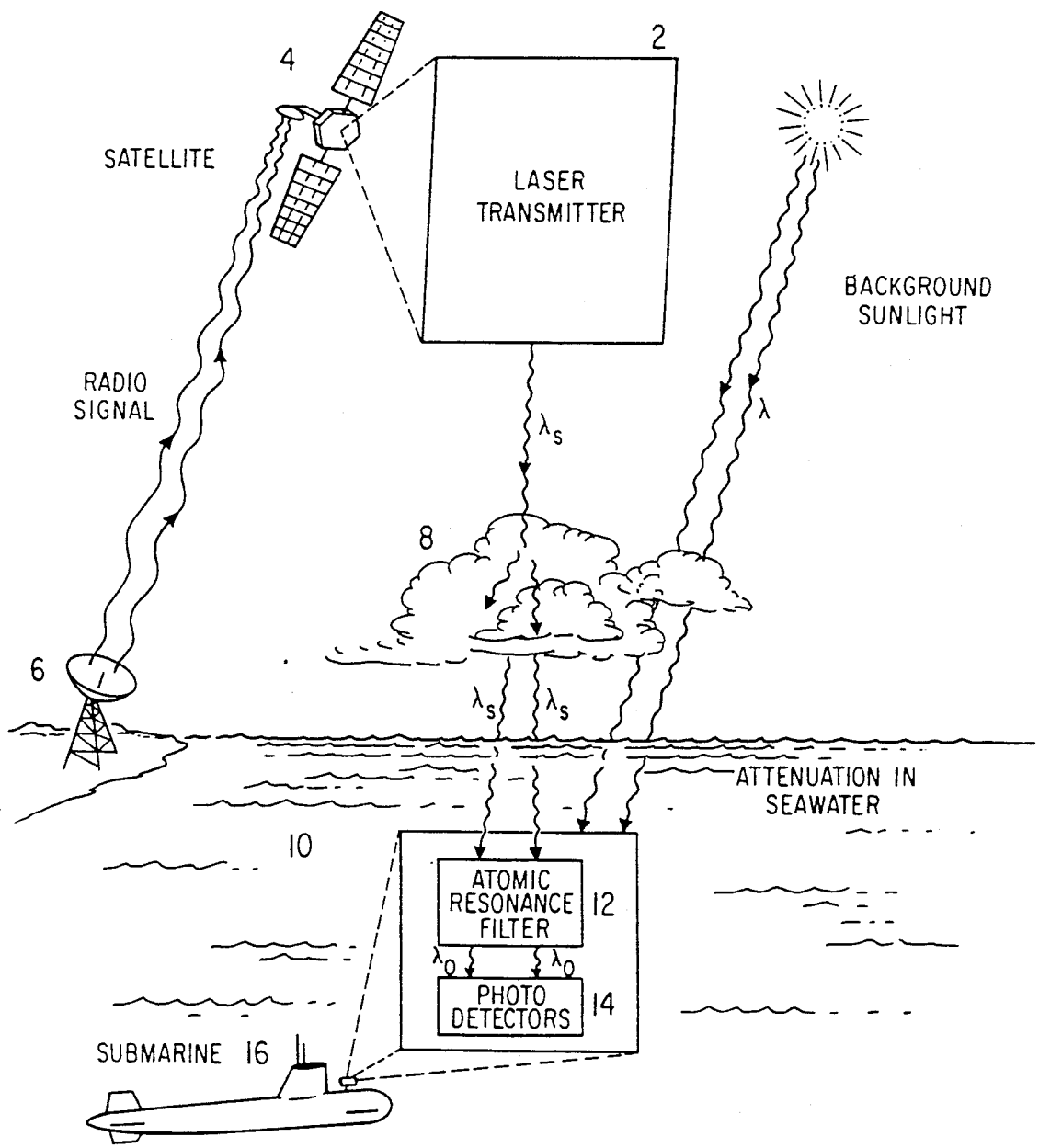
FIG. 1 illustrates an application of the invention as part of a system which includes a satellite-based laser transmitter and a submarine-based atomic resonance filter and detectors.
Figure 2:
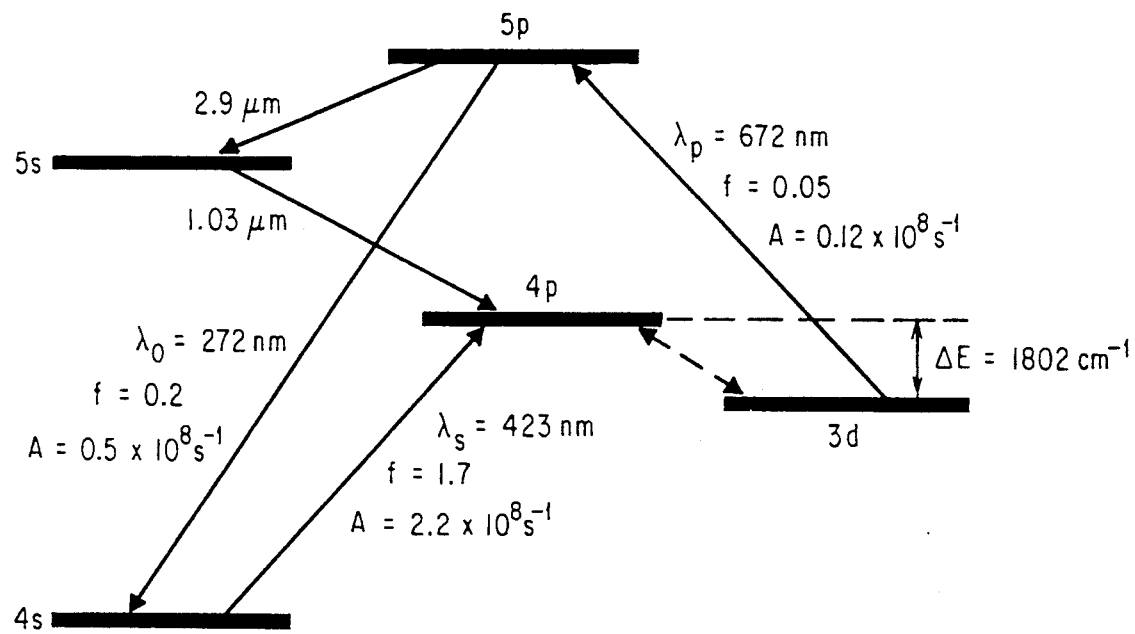
FIG. 2 is an energy level diagram for the calcium atomic filter.

The filter of the present invention is based upon the spectroscopy of atomic calcium. A. A. Radzig and B. M. Smirnov, Reference Data on Atoms, Molecules, and Ions (Springer-Verlog, Berlin, 1985) p. 200. A partial energy level diagram of the lowest singlet levels is shown in FIG. 2. The intense Fraunhofer signal transition occurs between the ground level $4s$ and the first excited state, $4p$.

Wavelength-shifting is accomplished by the combination of collisional energy transfer and laser pumping. First, collisions with a buffer gas transfers population from the $4p$ to $3d$ level. These levels are separated by 1802 cm$^{-1}$. Second, a low power laser excites atoms between the $3d$ and $5p$ levels. The corresponding wavelength is 672 nm and the absorption is strong. Atoms in the upper level then decay back to the ground level with the emission of UV photons at 272 nm. Experimental work on the Mg filter has established that collisional energy transfer combined with laser pumping is an effective means to upshift absorbed signal light. Y. C. Chan, M. D. Tabat, and J. A. Gelwachs, "Experimental Demonstration of Internal Wavelength Conversion in the Magnesium Atomic Filter", Optics Letter 14, 722-724 (15 July 1989). For rapid collisional transfer and intense laser pumping, we calculate that the conversion of absorbed deep blue light into UV photons can be made highly efficient, namely, about 95%. J. A. Gelbwachs, "Active Wavelength—Shifting in Atomic Resonance Filters", scheduled for publication in June 1990 issue of the IEEE Journal of Quantum Electronics. Other filter properties include a 20 nsec response time, low pump power requirements, and low noise operation. In one embodiment of the present invention, the filter operated at about 300° C. and its bandwidth could be broadened by pressure.

Figure 3:
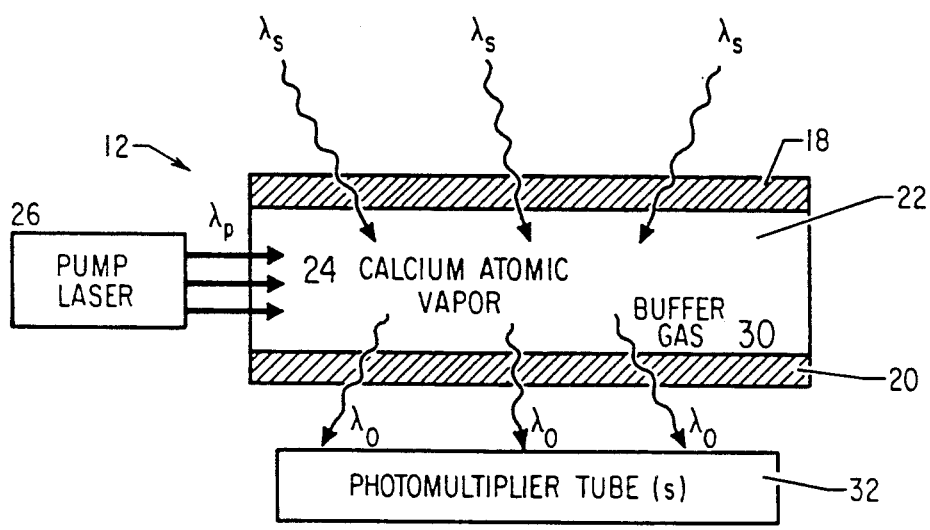
FIG. 3 is a schematic of the calcium atomic resonance filter.

FIG. 3 illustrates a preferred embodiment of the invention in conjunction with a typical atomic resonance filter. Referring to FIG. 3, the atomic resonance filter 12 comprises a first optical filter 18 and second optical filter 20 which form a cavity 22 in which calcium atomic vapor 24 is placed. Incoming light $\lambda_s$ to be detected, i.e., 422.674 nm, passes through first filter 18, which has a cutoff wavelength $\lambda_{c1}$ where $\lambda_s > \lambda_{c1}$.

The second optical filter 20 passes the UV light at $\lambda_o$ but excludes longer wavelengths including $\lambda_p$ and $\lambda_s$. The second filter 20 has a cutoff wavelength $\lambda_{c2}$, where $\lambda_o < \lambda_{c2} < \lambda_{c1}$. The $\lambda_o$ emission then strikes the detecting surfaces of photomultiplier tube 32. It is important to note that UV light at $\lambda_o$ which strikes the detecting surface of tube 32 at a wavelength of about 272 nm is in the optimum wavelength region for sensitive detection by photomultiplier tubes 32.

Table I compares features of the present invention with cesium and magnesium filters. In particular, Table I displays the key feature of the calcium filter, namely, its extraordinary capability to reject solar background.

TABLE I

SOLAR BACKGROUND REJECTION
OF SELECT ATOMIC FILTERS

| | Cesium | Magnesium | Calcium |
|---|---|---|---|
| Signal Wavelength(s) (nm) | 455,459 | 516,517,518 | 423 |
| Emitted Wavelength(s) (nm) | 852,894 | 384 | 272 |
| Solar Backround (KW/cm$^2$·$\mu$m)$^A$ | 1.1(0 db) | 1.2 (−1 db) | 0.75 (+2 db) |
| Natural Solar Rejection Advantage$^B$ (Fraunhofer Overlay) | 1 (0 db) | 10 (10 db) | 40 (+16 db) |
| Background Channels | 4 (0 db) | 3 (+1 db) | 1 (+6 db) |
| Total Background Rejection Advantage (Doppler-Limit | 1 | 4.3 | 100 |
| Total Background Rejection Advantage | 1 (0 db) | 11 (+10 db) | 250 (+24 db) |

TABLE I-continued

SOLAR BACKGROUND REJECTION
OF SELECT ATOMIC FILTERS

| | Cesium | Magnesium | Calcium |
|---|---|---|---|
| (2 GHz Bandwidth) | | | |

$^A$The Infrared Handbook. W. L. Wolfe and G. J. Zissis, eds., ERIM. 1978, p. 3-37.
$^B$Astrophysical Quantities, C. W. Allen, Athlone Press, London, 1976, p. 168.

Table I compares solar background rejection of the canonical cesium filter; another prime developmental filter that operates in an intense green Fraunhofer line, the magnesium filter; and the calcium filter. Let us use the shorthand terms blue, green, and deep blue for the signal wavelengths for the Cs, Mg, and Ca filter, respectively. First, Table I shows that the solar background in the deep blue is less than in the blue or the green. More importantly, Table I shows that the intense calcium Fraunhofer line provides over a forty-fold reduction in solar background. This is four times as great as the sunlight rejection provided by the Mg filter.

Further, the number of background channels for Ca is one, the minimum value. Most other filters possess three or more absorption lines that permit transmission of solar background. The origin of the single channel can be traced to lack of electron and nuclear spins for the calcium filter transitions. When present, these factors split absorption lines into fine-structure and hyperfine components. The zero value of nuclear spin and total electron spin gives the calcium filter a 6 db advantage compared to the cesium filter.

The total background rejection advantage at the Doppler limit of each transition appears in the next row of Table I. The following temperatures were assumed: Cs(T=100° C.), Mg(T=300° C.), and Ca(T=300° C.). The calculated Doppler widths are 0.8, 2, and 2 GHz, respectively. It can be seen that the calcium filter offers two orders of magnitude improved background rejection compared with the cesium filter at the Doppler-limit. It is also of systems interest to note the background rejection when the filters are broadened to accommodate transmitter Doppler shifts. The shifts are on the order of several GHz. Under these conditions, the calcium filter provides a total background rejection 250 times that of the cesium filter. The 24 db advantage is the sum of three factors; solar background, Fraunhofer overlay, and number of background channels. It is interesting to note the calcium is superior to the other filers in all three categories.

It can be seen that the calcium filter emits light in the UV region where rugged, highly efficient, well-developed, commercial PMTs are available. The theoretical maximum internal conversion efficiency places this filter among the best. Further, the response time as given by the reciprocal of the Einstein A coefficient is 20 nsec, thus MHz information rates should be possible. Because the strength of the emitting transition is less than the strength of the signal line, radiation trapping will not limit the response time. The filter requires a low power laser at 672 nm, a spectral region for which diode lasers are under development. The power requirements for the filter are minimal since pump power is absorbed only in the presence of signal. Other active filters based upon resonance-line pumping consume much more power because the atoms continuously undergo real transitions. Furthermore, because there are no excited atoms in the absence of signal, noise due to the energy pooling processes are ruled out. The lack of ground state resonance with the pump laser wavelength assures that multi-photon processes do not occur that produce noise.

Although the invention has been described in terms of a preferred embodiment, it will be obvious to those skilled in the art that alterations and modifications may be made without departing from the invention. Accordingly, it is intended that all such alterations and modifications be included within the spirit and scope of the invention as defined by the appended claims.

I claim:

1. An improved method for suppressing solar background in a receiver of laser light, comprising the steps of:
   a. providing a first optical filter having an optical transmission wavelength greater than a first cutoff wavelength $\lambda_{c1}$;
   b. providing a second optical filter spaced apart from the first optical filter and having an optical transmission wavelength less than a second cutoff wavelength $\lambda_{c2}$, where $\lambda_{c2}$ is less than $\lambda_{c1}$;
   c. providing a pump laser with output $\lambda_p$;
   d. providing calcium vapor positioned between and adjacent to the first and second optical filters;
   e. providing a buffer gas positioned between and adjacent to the first and second optical filters;
   f. transmitting light at a wavelength $\lambda_s$ centered at a Fraunhofer line in the deep blue portion of the spectrum, where $\lambda_s$ is greater than $\lambda_{c1}$, thereby exciting the calcium to a first excited state;
   g. colliding the excited calcium vapor with the buffer gas, thereby exciting the calcium vapor to a second excited state;
   h. optically pumping the excited calcium vapor with output $\lambda_p$, thereby exciting the calcium vapor to a third excited state;
   i. relaxing the excited calcium vapor to a ground level, thereby emitting output light at a wavelength $\lambda_o$;
   j. passing light at wavelength $\lambda_o$ through the second optical filter, where $\lambda_o$ is less than $\lambda_{c2}$;
   k. detecting light at wavelength $\lambda_o$ at the laser light receiver.

2. The method as claimed in claim 1, wherein the calcium is excited to the first excited state by light at a wavelength $\lambda_s = 423$ nm, is optically pumped to the third excited state by light at a wavelength $\lambda_p = 672$ nm and emits output light at a wavelength $\lambda_o = 272$ nm.

3. The method as claimed in claim 1, wherein said Fraunhofer line is at a wavelength $\lambda = 422.674$ μm.

* * * * *